US007020797B2

(12) United States Patent
Patil

(10) Patent No.: US 7,020,797 B2
(45) Date of Patent: Mar. 28, 2006

(54) AUTOMATED SOFTWARE TESTING MANAGEMENT SYSTEM

(75) Inventor: Narendra Patil, Santa Clara, CA (US)

(73) Assignee: Optimyz Software, Inc., Santa Clara, CA (US)

( * ) Notice: Subject to any disclaimer, the term of this patent is extended or adjusted under 35 U.S.C. 154(b) by 633 days.

(21) Appl. No.: 10/133,039

(22) Filed: Apr. 25, 2002

(65) Prior Publication Data

US 2003/0051188 A1 Mar. 13, 2003

Related U.S. Application Data

(60) Provisional application No. 60/318,432, filed on Sep. 10, 2001.

(51) Int. Cl.
*G06F 11/00* (2006.01)

(52) U.S. Cl. .............................. 714/4; 714/38; 714/48; 714/51; 714/55; 709/223; 709/224

(58) Field of Classification Search .................... 714/4, 714/38, 48, 51, 55, 8; 709/223, 224
See application file for complete search history.

(56) References Cited

U.S. PATENT DOCUMENTS

| | | | | |
|---|---|---|---|---|
| 5,544,310 | A | 8/1996 | Forman et al. | |
| 5,742,754 | A | 4/1998 | Tse | |
| 6,014,760 | A | 1/2000 | Silva et al. | |
| 6,031,990 | A | 2/2000 | Sivakumar et al. | |
| 6,041,354 | A * | 3/2000 | Biliris et al. | 709/226 |
| 6,061,517 | A | 5/2000 | House et al. | |
| 6,119,247 | A | 9/2000 | House et al. | |
| 6,163,805 | A | 12/2000 | Silva et al. | |
| 6,167,537 | A | 12/2000 | Silva et al. | |
| 6,195,765 | B1 | 2/2001 | Kislanko et al. | |
| 6,219,829 | B1 | 4/2001 | Sivakumar et al. | |
| 6,298,392 | B1 * | 10/2001 | White | 710/8 |
| 6,415,190 | B1 * | 7/2002 | Colas et al. | 700/79 |
| 6,665,716 | B1 * | 12/2003 | Hirata et al. | 709/224 |
| 6,810,364 | B1 * | 10/2004 | Conan et al. | 702/188 |
| 6,820,221 | B1 * | 11/2004 | Fleming | 714/31 |

* cited by examiner

*Primary Examiner*—Bryce P. Bonzo
*Assistant Examiner*—Emerson Puente
(74) *Attorney, Agent, or Firm*—Sawyer Law Group LLP

(57) ABSTRACT

A system and method for automatically managing a distributed software test execution, management and reporting system that includes a network of test computers for executing a plurality of test jobs and at least one client computer for controlling the test computers is disclosed. The method and system include providing the test computers with a service program for automatically registering availability of the computer and the attributes of the computer with the client computer. The execution requirements of each test job are compared with the attributes associated with the available computers, and the test jobs are dispatched to the computers having matching attributes. The method and system further include providing the service programs with a heartbeat function such that the service programs transmit signals at predefined intervals over the network to indicate activity of each test job running on the corresponding computer. The client computer monitors the signals from the service programs and determines that a failure has occurred for a particular test job when the corresponding signal is undetected. The client then automatically notifies the user when a failure has been detected.

27 Claims, 11 Drawing Sheets

SCHEDULING

SCALABILITY

FAULT DISCOVERY & RECOVERY

PROGRESS

RESULT-REPORTING

AUTOMATED SOFTWARE TESTING MANAGEMENT SYSTEM

CROSS REFERENCE TO RELATED APPLICATION

This application is claiming under 35 USC 119(e) the benefit of provisional patent application Ser. No. 60/318,432, filed Sep. 10, 2001.

FIELD OF THE INVENTION

The present invention relates to software testing systems, and more particularly to a method and system for managing and monitoring tests in a distributed and networked testing environment.

BACKGROUND OF THE INVENTION

In recent years, companies are continuing to build more complex software systems that may include client applications, server applications, and developer tools, all of which need to be supported on multiple hardware and software configurations. This is compounded by the need to deliver high quality applications in the shortest possible time, with the least resources and often involving geographically distributed organizations. Having sensed these realities and complexities, companies are increasingly resorting to writing the applications in Java/J2EE.

Although Java is based on the "write once, run anywhere" paradigm, quality assurance (QA) efforts are nowhere close to the "write tests once and run anywhere" because modern-day software applications still must be tested on a great number of heterogeneous hardware and software platform configurations. Some companies have developed internal QA tools to automate local testing of the applications on each platform, but completing QA jobs on a wide array of platforms continues to be a large problem.

Typically, multi-platform software testing requires a great amount of resources in terms of computers, QA engineers, and man-hours. Because the QA tasks or tests are run on various different types of computer platforms, there is no such point of control, meaning that a QA engineer must first create an inventory of the computer configurations at his or her disposal and match the attributes of each computer with the attributes required for each of the test jobs. For example, there may be various computers with different processors and memory configurations, where some operate under the Windows NT™ operating system while others operate under Linux and some others operating under other UNIX variants (Solaris, HPUX, AIX). The QA engineer must manually matchup each test job written for specific processors/memory/operating system configurations with the correct computer platform.

After matching the test jobs with the appropriate computer platform, a QA engineer must create a schedule of job executions. The QA engineer uses the computer inventory to create a test matrix to track how many computers with a particular configuration are available and which tests should be run on each computer. Almost always, the number of computers is less than the total number of test jobs that need to be executed. This creates a sequential dependency and execution of the tests. For example, if one test completes execution in the middle of the night, the QA engineer cannot schedule another test on the computer immediately thereafter because the startup of the next test requires human intervention. Therefore, the next test on this computer cannot be scheduled until the next morning. In addition, this guesswork for the completion time for the test jobs does not always work because the speed at which the test executes depends on many other external factors, such as the network. One can visualize the difficulties of scheduling and managing the QA tests if there are thousands of tests to be run on various platforms.

Once the jobs are scheduled, the test engineer must then physically go to each computer and manually set up and start each test. Once the tests are in progress, one must visit each of computers in order to check the current status of each test. This involves a lot of manual effort and time. If a particular test has failed, then one must track down the source of the failure, which may be the computer, the network, or the test itself. Because QA engineers are usually busy with other meaningful work, such as test development or code coverage, when the tests are being executed, the QA engineers may not attend to all of the computers to check the status of the tests as often as they should. This delay is the detection and correction of the problems and increases the length of the QA cycle.

This type of manual testing approach also curtails the usage of computer power. Consider for example a situation where a test engineer must run five tests on a particular platform and only has one computer with that configuration. Suppose that the first test last for eight hours. The QA engineer will usually start the first job in evening, so that he has the computer free to run the other tests during the day. If the first test hangs for whatever reason during the night, there's no way to QA engineer will realize it until the morning when he goes back to check the status. Therefore many wasted hours pass before the tests can be restarted.

Because a test may fail several times, the execution of the test finishes in several small steps making the reconciliation of tests logs and results a tedious and time-consuming process. At the end of the test cycle, one must manually collect the tests logs and test results from each of the computers, manually analyze them, and create status web pages and file the bugs. This is again a very tedious and manual process.

What is needed is a test system that manages and automates the testing of software applications, both monolithic as well as distributed. Basically, the test management system should enable the "write once, test everywhere" paradigm. The present invention addresses such a need.

SUMMARY OF THE INVENTION

The present invention provides a method and system for automatically managing a distributed software test system that includes a network of test computers for executing a plurality of test jobs and at least one client computer for controlling the test computers. The method and system include providing the test computers with a service program for automatically registering availability of the computer and the attributes of the computer with the client computer. The execution requirements of each test job are compared with the attributes associated with the available computers, and the test jobs are dispatched to the computers having matching attributes. The method and system further include providing the service programs with a heartbeat function such that the service programs transmit signals at predefined intervals over the network to indicate activity of each test job running on the corresponding computer. The client computer monitors the signals from the service programs and determines a failure has occurred for a particular test job when the corresponding signal is undetected. The client then automatically notifies the user when a failure has been detected.

According to the system and method disclosed herein, the present invention provides an automated test management system that is scalable and which includes automatic fault detection, notification, and recovery, thereby eliminating the need for human intervention.

DETAILED DESCRIPTION

The present invention relates to an automated test management system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
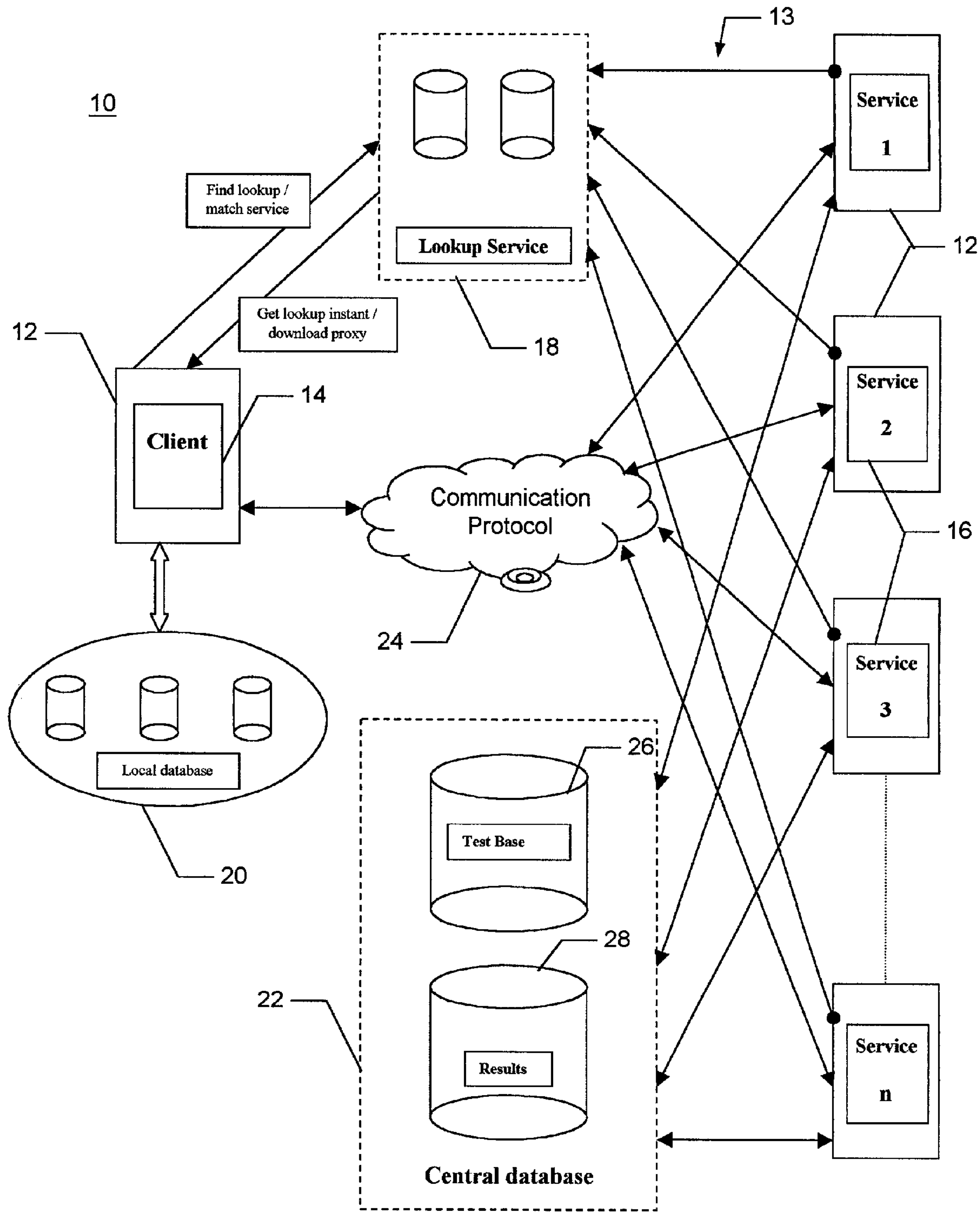
FIG. 1 is a block diagram illustrating an automated test management system for testing software applications in accordance with a preferred embodiment of the present invention.

FIG. 1 is a block diagram illustrating an automated test management system 10 for testing software applications in accordance with a preferred embodiment of the present invention. The system 10 includes multiple computers 12 connected to a network 13. In a preferred embodiment, the computers 12 have different types of hardware and software platform attributes, meaning that the computers 12 have various memory, processor, hard drive, and operating system configurations. As explained above, in a conventional quality assurance environment (QA), a QA engineer would have to manually assign, schedule, and start test jobs on each computer for the purposes of testing a particular software application on various platforms.

In accordance with the present invention, however, the automated test management system 10 further includes client software 14 running on one of the computers 12 in the network 13 (hereinafter referred to as the client 14), remote service programs 16 running on each of the computers 12, a lookup service 18, a local client database 20, a central database 22 that stores test jobs and their results and a communications protocol 24 for allowing the client software 14 to communicate with the remote service programs 16.

The client 14 is the critical block of the automated test management system 10 as it controls and monitors the other components of the system 10. The client 14 chooses which computers 12 to run which test jobs, schedules the test jobs on the appropriate computers 12, manages the distribution of the test jobs from the central database to those computers 12, and monitors the execution progress of each test job for fault detection. Once a fault is detected, the client 14 notifies a user and the schedules the job on a different computer. In addition, the client 14 can display the status, test results, and logs of any or all test jobs requested by the user.

The remote service programs 16 running on the computers 12 manage the execution of the test jobs sent to it when requested by the client 14. In a preferred embodiment, the remote service programs 16 are started on the computers 12 as part of the boot process and remain running as long as the computer is running unless explicitly stopped by a user. When the remote service program 16 is started, the service program 16 searches for the lookup service 18 over the network 13 and registers its availability and the attributes of the corresponding computer.

The lookup service 18 is a centralized repository in which participating service programs 16 register so that the availability of all successfully registered service programs 16 and the corresponding computers 12 are automatically published to the client software 14 and other service programs 16 within the network 13.

The central database 22 includes a test database 26 for storing executable versions of the test jobs to be run and a result/logs database 28 for storing the results of these test jobs executed on the computers 12 and the logs of the test jobs. Both the code for each test jobs as well as the computer attributes required to run the test job are stored in the central database 22.

When the client 14 determines that a test job from the central database 22 needs to be dispatched to a computer for execution, the client 14 queries the lookup service 18 to determine if there are any available computers 12 that match the required attributes of the test job. Once the service program 16 receives the test job dispatched by the client 14 service program 16 creates an environment to run the test job and then launches a test management system (TMS FIG. 4), which in turn, runs the test job. The TMS 94 may be optionally bundled with the remote service program 16, or the TMS 94 may comprise any other automated harness/script/command-line used for QA.

The communication protocol 24 is a set of APIs included in both the client 14 and the remote service programs 16 that provide the necessary protocols 24 as well as an interface that allows the client 14 and the remote service programs 16 to communicate with each other and to send and receive control and data. It provides the necessary channel to the client 14 and the service programs 16 to be connected and notified.

Figure 2:
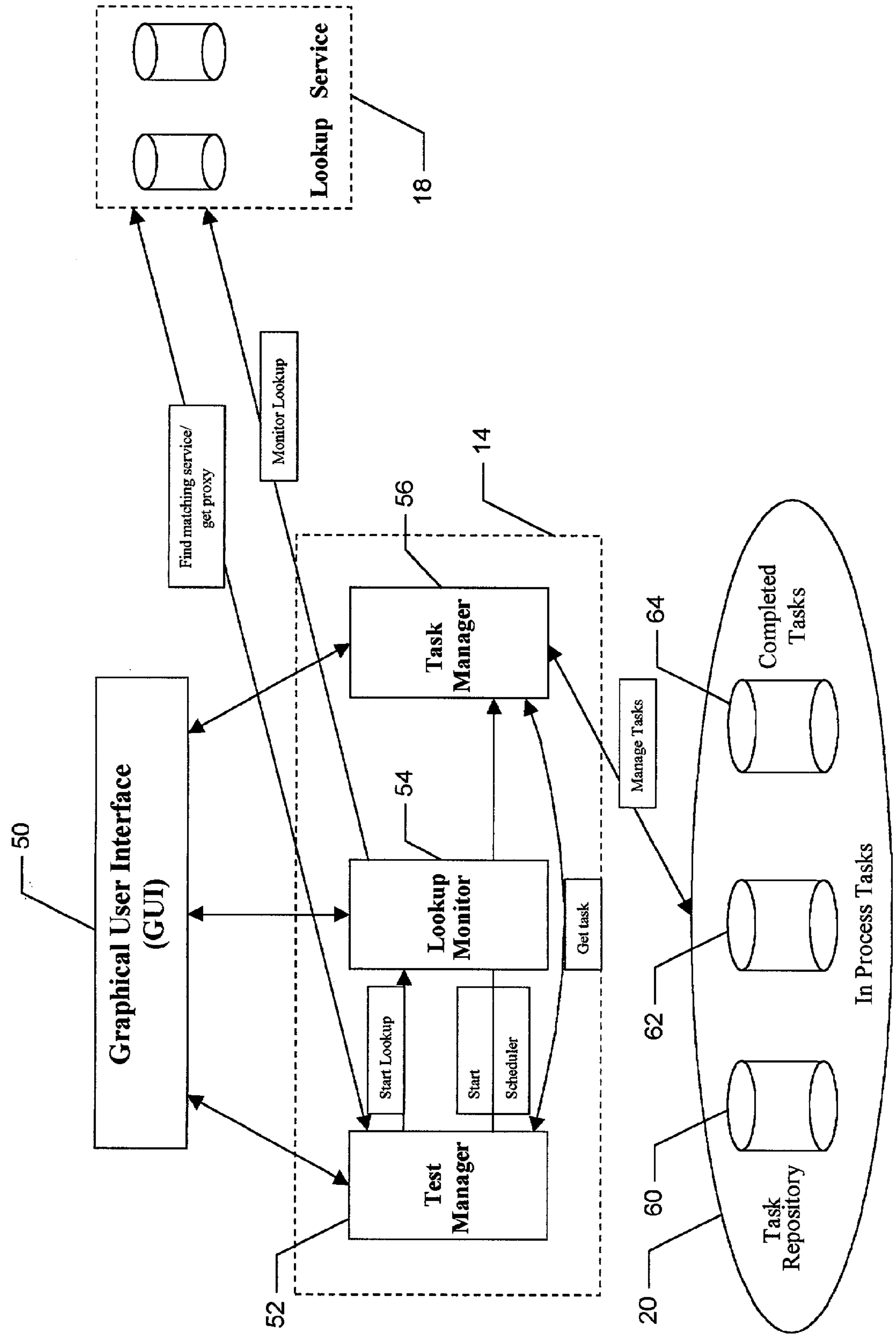
FIG. 2 is a block diagram illustrating the contents of the client in a preferred embodiment.

FIG. 2 is a block diagram illustrating the contents of the client 14 in a preferred embodiment. The client 14 comprises the following software modules: a graphical user interface 50, a test manager 52, a lookup monitor 54, and a task manager 56.

The graphical user interface (GUI) 50 allows the user to create and update test jobs in the central database 22, and initiates the process of dispatching test jobs to matching computers 12. The GUI 50 also provides the interface for allowing the user to check the status and progress of each test job or group of test jobs, terminate a test job or group, and view the final and intermediate results of the test jobs.

The lookup monitor 54 is a process that checks for the existence of the lookup service 18 and monitors the lookup service 18 to determine which of the remote services programs 16 on the network 13 have been registered, added, removed, and updated. If the lookup monitor 54 determines that the lookup service 18 has failed, the lookup monitor 54 notifies the user via the GUI 50 or directly via e-mail.

The task manager 56 manages the local database 20, which includes a task repository 60, an in-process-task repository 62, and a completed task repository 64. The task manager 56 scans the test database 26 for previous test jobs and any newly added test jobs, and creates a file for each of the test jobs in the task repository 60. Each file includes the computer attributes required for the test job, the priority assigned to the test job, and a reference to the code needed to run the test job stored in the test database 26. The task manager 56 marks the test jobs in the task repository 60 as "available for execution" when each test job is due for execution based on its time-stamp.

In operation, the test manager 52 starts the lookup monitor 54, which then searches for available lookup services 18 on the network 13. Once the lookup service 18 is found, the test manager 52 starts a scheduler to create a prioritized list of test jobs for execution from the test jobs in the task repository 60 based on priorities, time-stamps, and any other relevant information for scheduling associated with each test job.

After the test jobs have been prioritized, the test manager 52 requests from the task manager 56 the test jobs marked as "available for execution" according to the priority, and finds computers 12 having attributes matching those required by those test jobs. The task manager 56 then dispatches the test jobs to the matching computers 12 and stores a reference to each of the dispatched test jobs in the in-process-task repository 62. As the test jobs complete execution, the remote service programs 16 notify the client 14, and the task manager 56 removes the reference for the test job from the in-process-task repository 62 and stores a reference in the completed task repository 64. When the user requests the status of any of the test jobs via the GUI 50, the local database 20 is queried and the results are returned to the GUI 50 for display.

Figure 3:
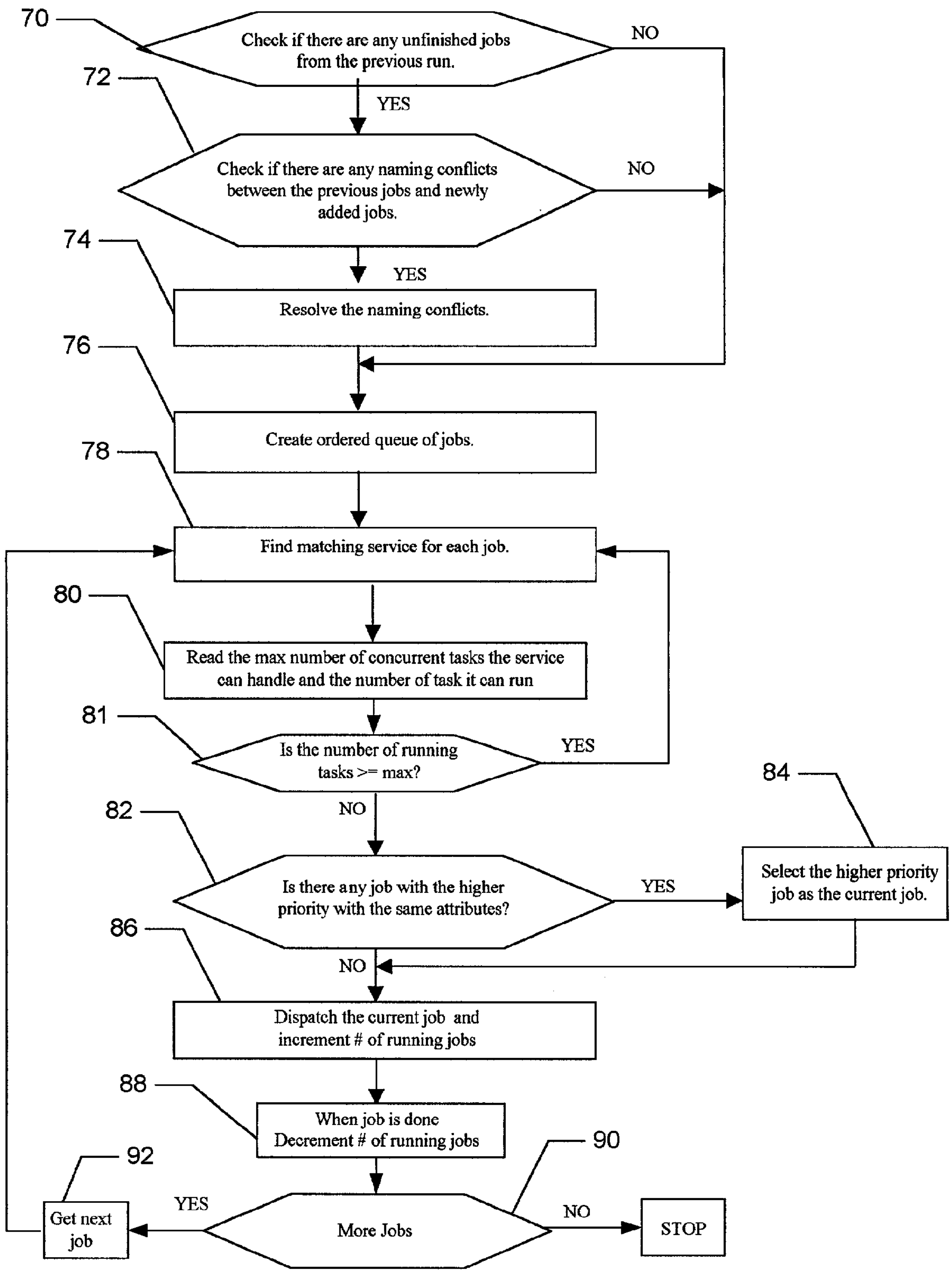
FIG. 3 is a flow chart illustrating the process of scheduling and prioritizing test jobs for execution.

FIG. 3 is a flow chart illustrating the process of scheduling, prioritizing and parallel execution of the test jobs. The process begins in step 70 by checking if there are any unfinished jobs from the previous run in the in-process task repository 60. If there are previous jobs, then the names of the newly added jobs and the names of the previous jobs are compared to determine if there are any naming conflicts in step 72. If there are naming conflicts, the naming conflicts are resolved in step 74, preferably by displaying dialog box to the user. Alternatively, the naming conflicts could be automatically resolved by adding a numerical number, for instance, to one of the names.

After any naming conflicts have been resolved, an ordered queue of all the jobs in the task repository 60 is created in step 76. In a preferred embodiment, the rules for ordering the test jobs are governed by: 1) job dependencies, 2) priorities assigned to job groups, 3) individual job priorities, and then 4) alphanumeric ordering. Next, in step 78, the client 14 searches for a service program 16 that matches the first test job in the queue by comparing the attributes listed for the test job to the attributes of the service program's computer 12 registered in the lookup service 18.

It is possible that there are computers 12 on the network 13 having enhanced capabilities that allow them to execute more than one job simultaneously. In order to use the computer resources in an optimal manner, each service program 16 publishes the maximum number of concurrent tasks that each computer can execute as part of the computer's attributes. As the test jobs are dispatched, the client 14 keeps track the number of test jobs dispatched to each service program 16 and will consider the computer to be available as long as the number of test jobs dispatched is less than the number of concurrent jobs it can handle.

Accordingly, when a matching service program 16 is found in step 80, the maximum number of concurrent tasks that the service program 16 can handle and the number of tasks presently running under the service program 16 are read. If the number of tasks running is greater than or equal to the maximum in step 81, then another matching service is searched for in step 78.

If the maximum is greater than the number of tasks running, then the ordered list is traversed to determine if there are any other test jobs having the same attributes but a higher priority in step 82. If yes, the test job having the higher priority is selected as the current test job in step 84. The current test job is then dispatched to the matching service program 16 for execution in step 86. During this step, the file for the test job is removed from the ordered queue, and the number of tasks running under the service program 16 is incremented. When the test job has completed execution, the number of tasks running under the service program 16 is decremented in step 88. Dynamically incrementing and decrementing the number of jobs running under each service program 16 in this manner maximizes the parallel execution capabilities of each computer.

If there are more test jobs in the ordered queue in step 90, then the next test job in the ordered list is selected in step 92 and the process continues at step 78 to find a matching service program. Otherwise, the scheduling process ends.

Figure 4:
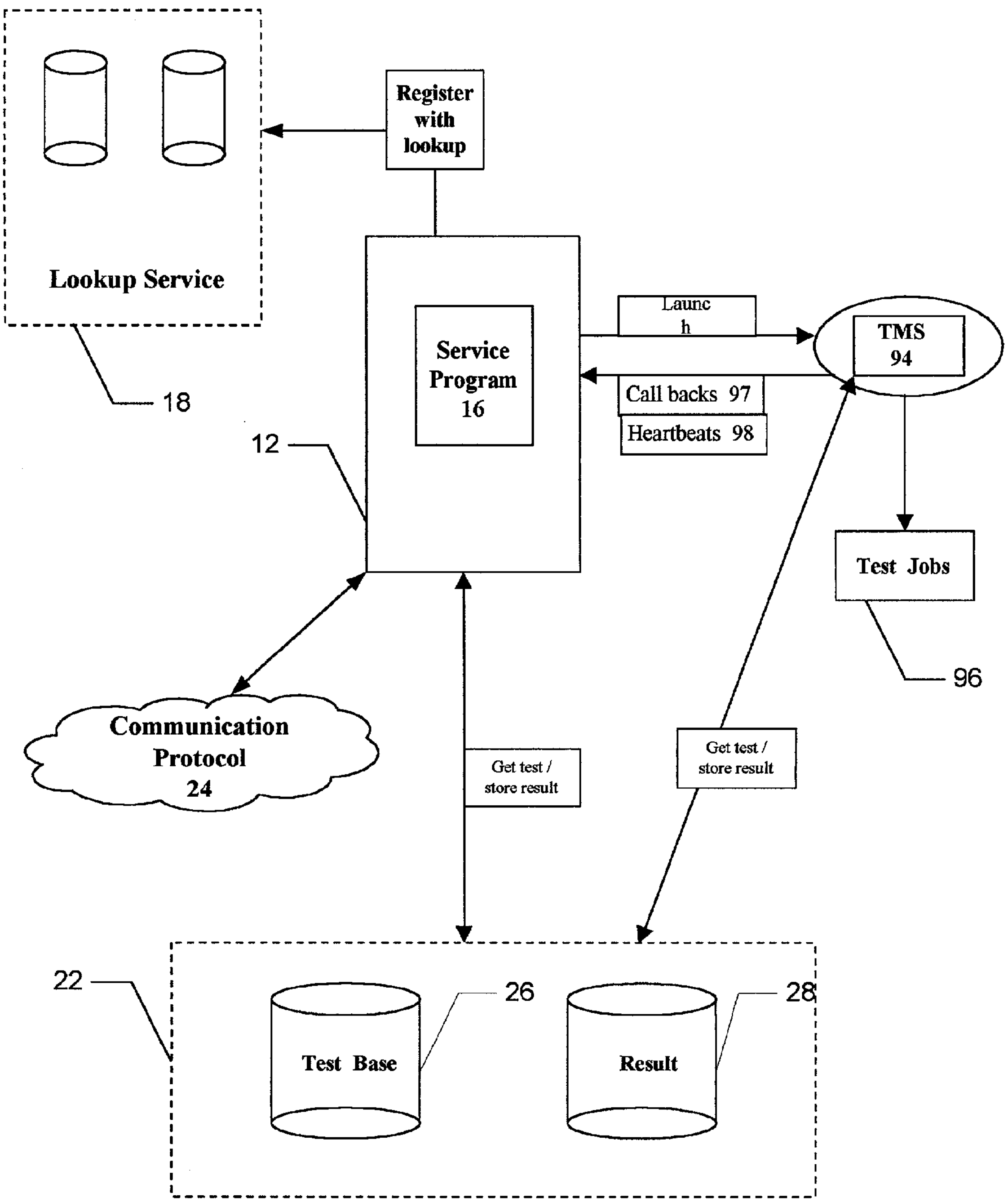
FIG. 4 is a block diagram illustrating the remote service program running on a computer.
Figure 5:
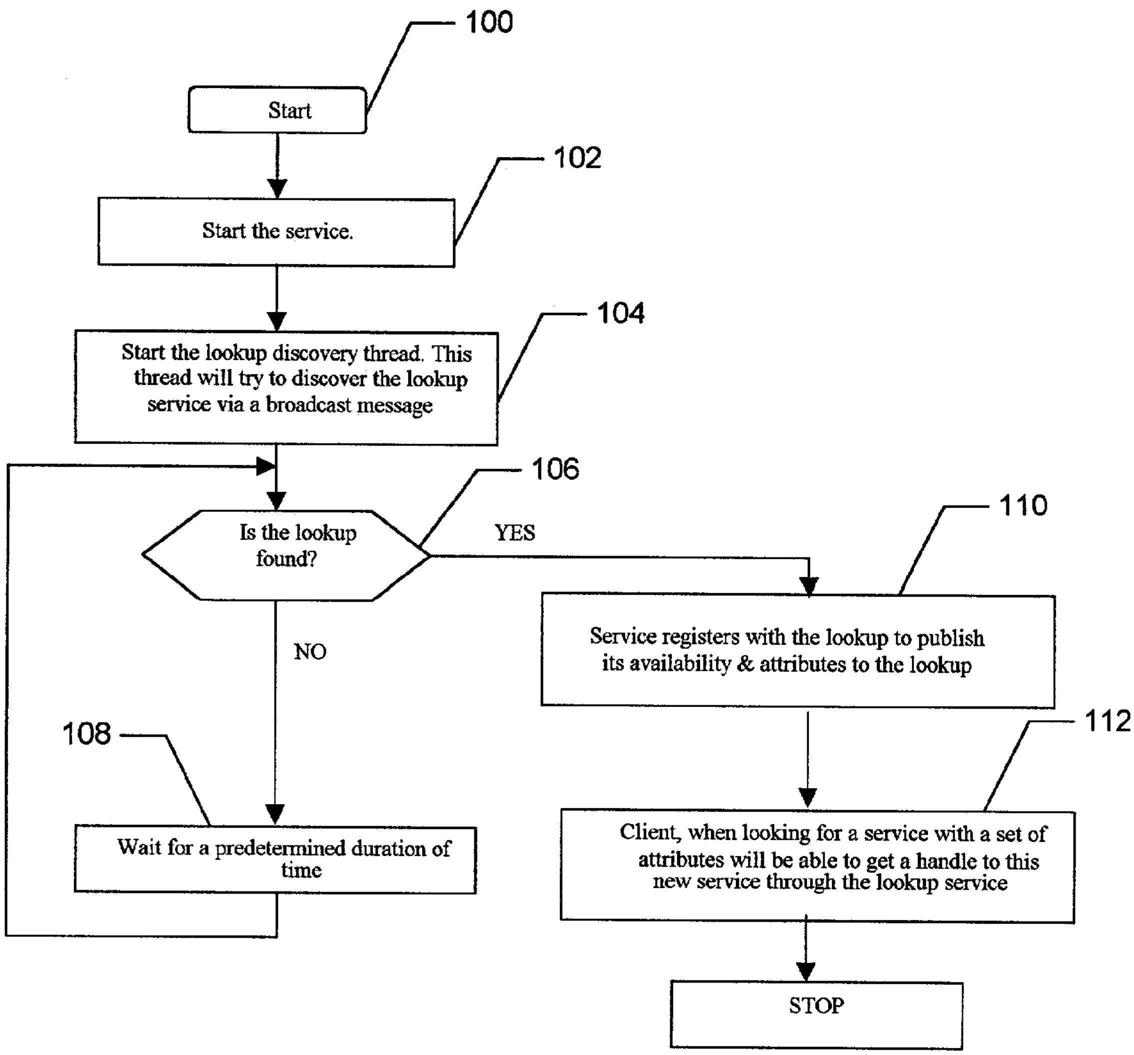
FIG. 5 is a flow chart illustrating the automatic registration process of the service program.

FIG. 4 is a block diagram illustrating a remote service program 16 running on a computer. And FIG. 5 is a flow chart illustrating the automatic registration process of the service program 16. In one aspect of the present invention, the system 10 is highly scalable due to the fact that any new devices added to the network 13 are dynamically identified and utilized for completing a set of test jobs. For example, the user might realize after some amount of time that the number of computers 12 allocated for testing are not sufficient to accomplish the given set of test jobs and that many of the test jobs are starving for services for more than a reasonable amount of time. The user may then decide to add more computers 12 to accomplish the task simply by loading additional computers 12 with service programs 16. According to the present invention, as the computers 12 and their service programs 16 come online, the client 14 dynamically identifies them. The client 14 then dispatches the starving test jobs to the newly added computers 12 and the test jobs are completed sooner, all without human intervention.

Referring to both FIGS. 4 and 5, the process begins when the computer is booted in step 100, and the service program 16 is started in step 102. A lookup discovery thread is then started in step 104 that attempts to discover the lookup service 18 by transmitting a broadcast message across the network 13. If a response is received from the lookup service 18 in step 106, then the lookup service 18 has been found. If no response is received, then the lookup discovery thread waits for a predetermined amount of time and rebroadcasts the message in step 108. Once lookup service 18 is found, the service program 16 registers its availability and the attributes of its computer with the lookup service 18 in step 110. Thereafter, the client 14 uses the lookup service 18 to find an available service program 16 running on a computer having a particular set of attributes to run particular types of test jobs in step 112.

Referring again to FIG. 4, once the service program 16 receives one or more test jobs from the client 14, the service program 16 creates the environment to run the test jobs and launches the test management system 10 (TMS) 94, which in turn, runs the test jobs 96. If the TMS 94 is bundled as part of the service program 16, then the service has very tight coupling. In the situation, the TMS 94 generates callback events 97 to indicate when a build process or individual test job 96 fails or generates any fatal errors or exceptions. The callback events 97 are then passed from the service program 16 to the client 14.

According to the present invention, the TMS 94 also transmits signals called heartbeats 98 to the service program 16 at predefined intervals for each test job 96 running. The service program 16 passes the heartbeat signal 98 to the client 14 so the client 14 can determine if the test job 96 is alive for automatic fault-detection, as explained further below. Upon termination of test job executions, the TMS 94 stores the results of each test job 96 in the central database 22, and the service program 16 sends an "end event" signal to the client 14.

In a further aspect of the present invention, the TMS 94 provided with the service program 16 works in stand-alone mode as well as client-server mode. The stand-alone mode performs the normal execution and management of test jobs 96, as described above. When the service program 16 receives a test job 96 that tests an application that includes both client 14 and server components, then the client-server TMS 94 is invoked.

Figure 6:
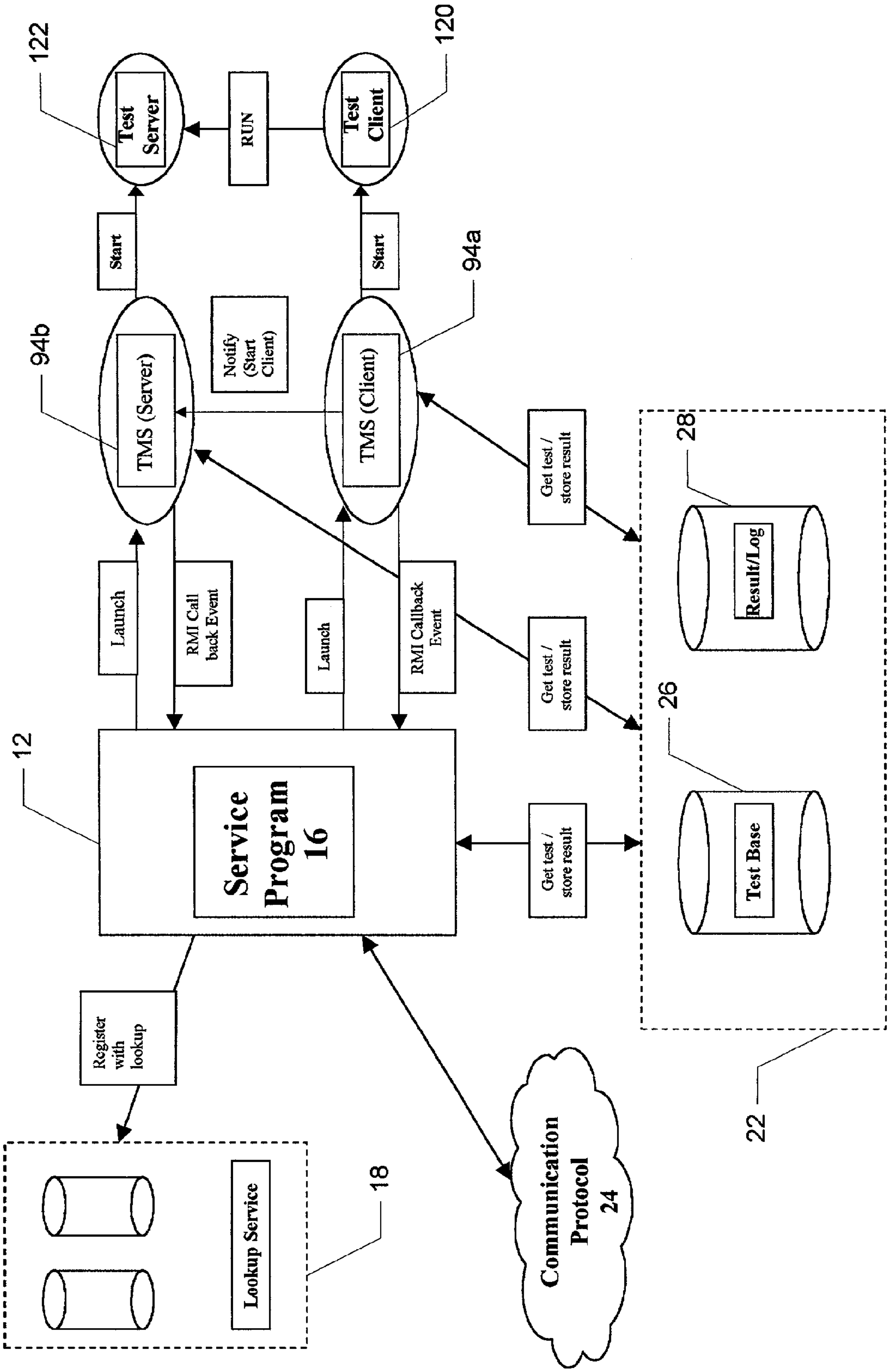
FIG. 6 is a block diagram illustrating the service program invoking a TMS in client-server mode.

FIG. 6 is a block diagram illustrating the service program 16 invoking a TMS 94 in client-server mode. In the client-server mode, one TMS 94*a* is invoked in client mode and a second TMS 94*b* is invoked in server mode. The TMS-server 94*b* is invoked first and starts a server test program 122 under the given test job. The TMS-server 94*b* then notifies the TMS-client 94*a* to start the corresponding client test program 120. Once the client test program 120 is started, the client and server programs 120 and 122 communicate with each other and complete the test. Both the TMS-server 94*b* and the TMS-client 94*a* transmit heartbeat and callback events information. The client-server mode of the TMS 94 resolves the complicated problem of automated client-server tasks, which need some sort of hand-shaking in the order of launching so that they can complete the task meaningfully.

Figure 7:
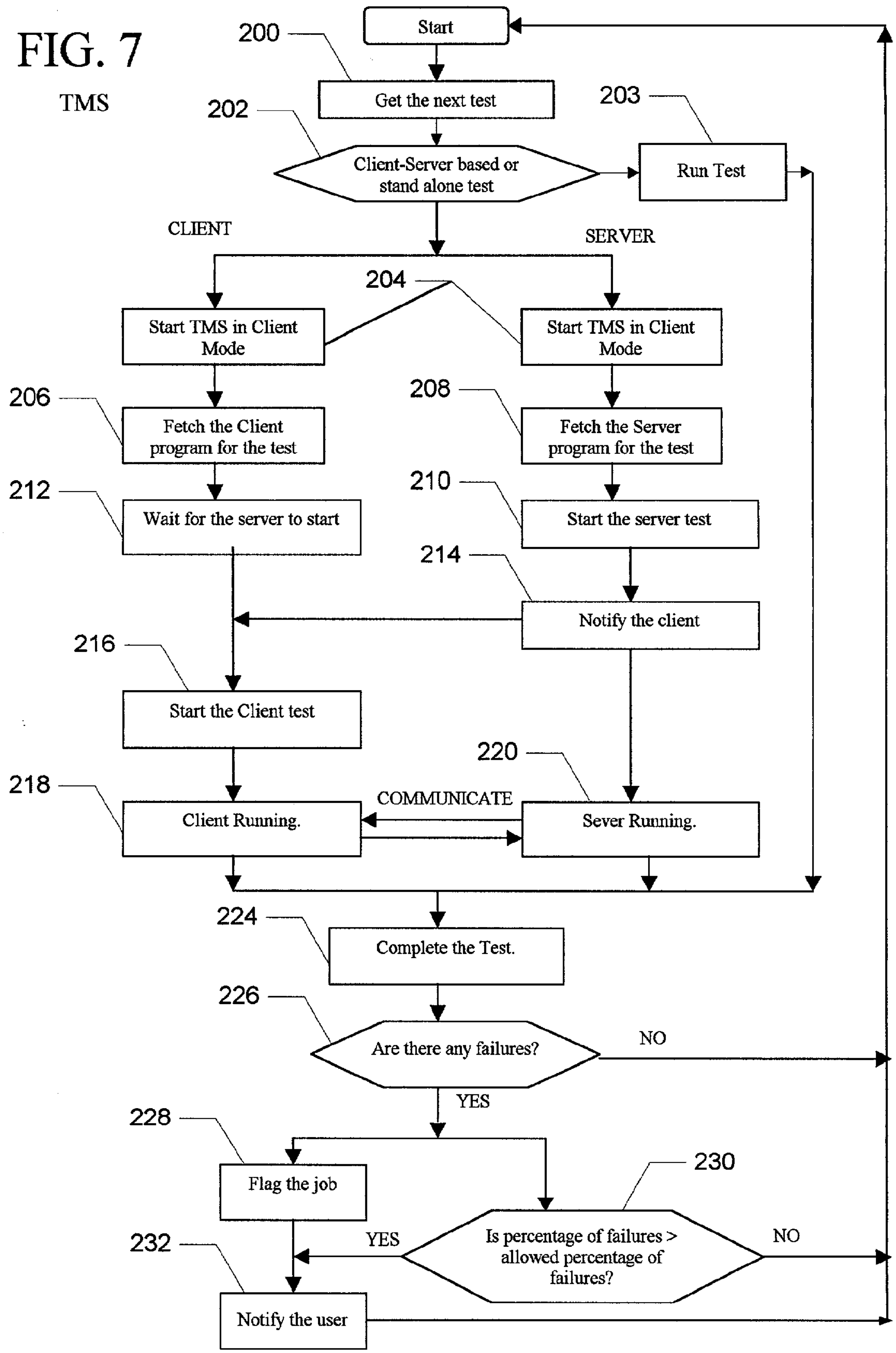
FIG. 7 is a flowchart illustrating the processing steps performed by the TMS when executing test jobs.

FIG. 7 is a flowchart illustrating the processing steps performed by the TMS 94 when executing test jobs 96. Once invoked, the TMS 94 first gets the next test job 96 to execute in step 200. It is then determined whether the test job 96 is client-server based or a stand-alone test in step 202. If the test job 96 is stand-alone, then the test job 96 is executed in step 203.

If the test job 96 is client-server based, then another TMS 94 is invoked so that the two TMS's can operate in client-server mode, as shown. One TMS 94 is started in client mode in step 204. The TMS-client 94*a* fetches the client program for the test job 96 in step 206, while the TMS-server 94*b* fetches the server program for the test job 96 in step 208. The TMS-server 94*b* then starts the server program in step 210. In the meantime, the TMS-client 94*a* waits for the server program to start in step 212. Once the server program is started, the TMS-server 94*b* notifies the TMS-client 94*a* in step 214. In response, the TMS-client 94*a* starts the client program in step 216. Once the client program is running in step 218 and the server program is running in step 220, the client and server programs begin to communicate.

Once the programs complete execution in step 224, it is automatically determined whether there are any test failures in step 226. If there are no test failures, the TMS 94 fetches the next test in step 200. If test failures are detected in step 226, then the test job 96 is flagged in step 228 and it is determined if the percentage of test failures is greater than an allowed percentage of failures in step 230. If the percentage of failures is greater than the allowed percentage of failures, then the user is notified in step 232, preferably via e-mail or a pop-up dialog box. If the percentage of failures is not greater than the allowed percentage, then the process continues via step 200.

As stated above, the client 14 performs automatic fault discovery and recovery for the test jobs 96. In a preferred embodiment, the present invention monitors whether there is a problem with each test job 96 by the following methods: 1) checking for starvation by monitoring how long each test job 96 waits to be executed under a service program 16, 2) checking for crashes by providing the service programs 16 with heartbeat signals 98 to indicate the activity of each running test job, 3) checking for run-time errors by comparing snapshots of test logs for each test job 96 until the test job 96 is done, and 4) checking maximum and minimum runtime allowed for a running job.

Figure 8A:
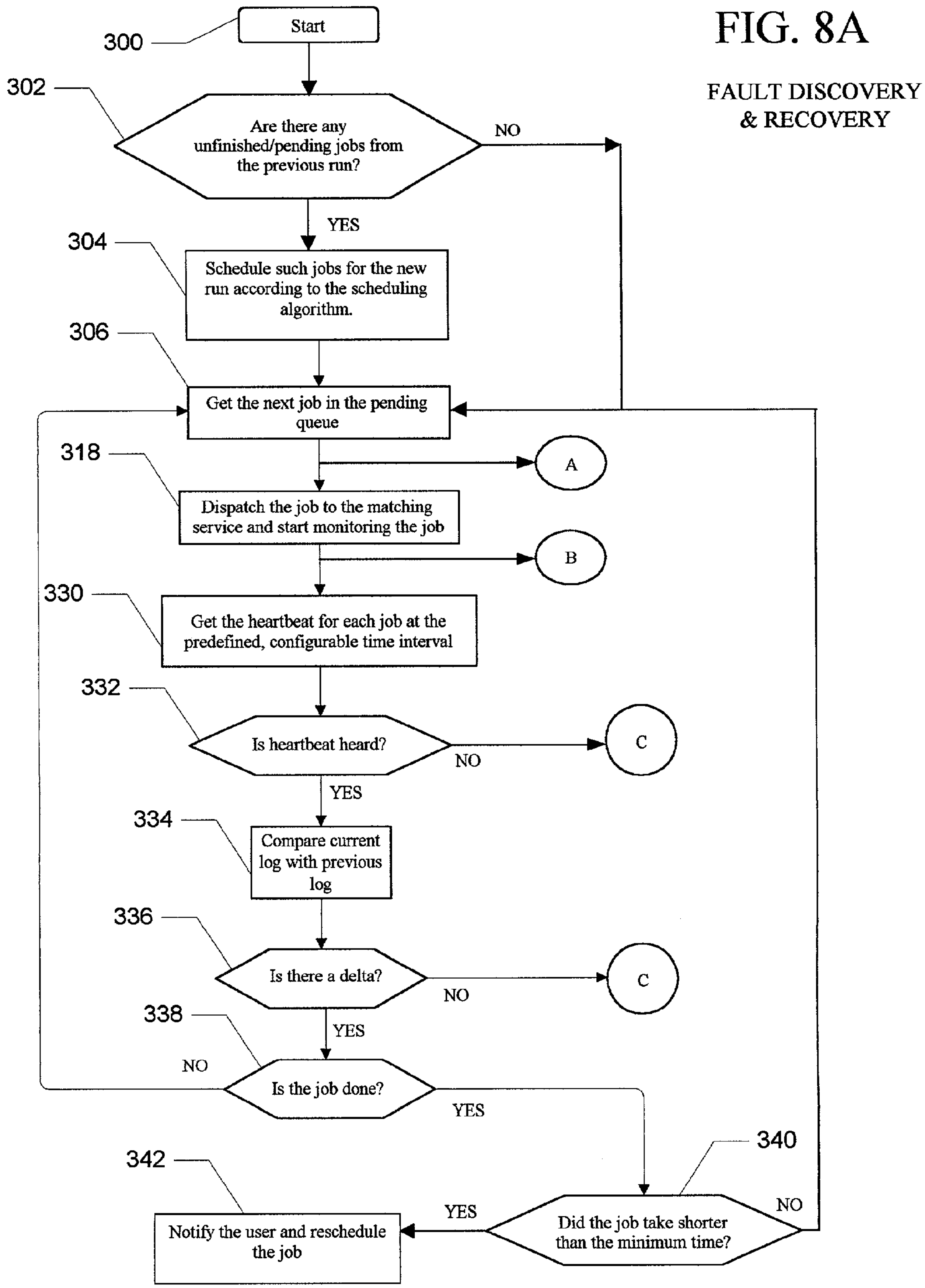
FIGS. 8A and 8B are a flowchart illustrating the automatic fault discovery and recovery process.
Figure 8B:
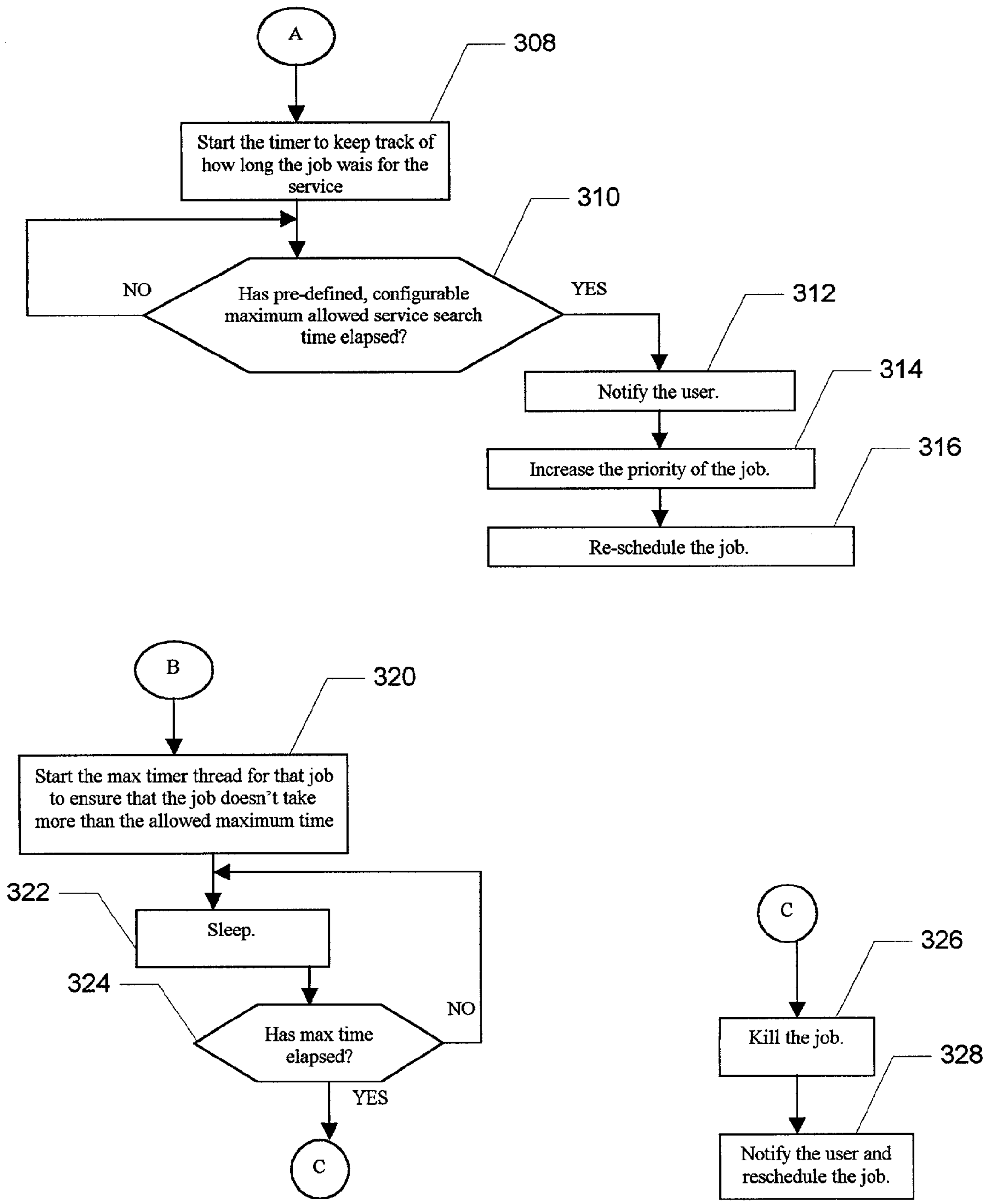

FIGS. 8A and 8B are flowcharts illustrating the automatic fault discovery and recovery process. The automatic fault discovery and recovery process begins in step 300 when a new run of test jobs 96 is initiated. First, the client 14 checks the in-process task repository 62 for any unfinished or pending jobs from the previous run in step 302. If there are test jobs 96 from the previous run, then the scheduler schedules those test jobs 96 in the new run in step 304. Checking for unfinished jobs is useful where, for example, the client 14 is restarted during a run before all of the jobs in that run complete execution. In this case, the jobs that were in progress may be detected and rescheduled.

Next, the client 14 gets the next test job 96 in the task repository 62 in step 306. Referring to FIG. 8B, the client 14 checks for starvation by starting a timer to keep track of how long the test job 96 waits for a service program 16 in step 308. It is then determined if a predefined, configurable maximum allowed service search time has elapsed in step 310. If so, the user is notified in step 312, the priority of the test job 96 is increased in step 314, and the test job 96 is rescheduled in step 316. These measures ensure the service programs 16 timely run each scheduled test job.

Referring again to FIG. 8A, the test job 96 is then dispatched to the matching service program 16, and the client 14 starts monitoring the test job 96 in step 318. Referring to FIG. 8B, the client 14 ensures that the test job 96 does not take more than the allowed maximum time to execute in step 320 by starting a maximum timer thread for that test job. The timer thread sleeps for predetermined amount of time in step 322 and then determines if the maximum job execution time has elapsed in step 324. If not, the thread sleeps again. If the maximum time has elapsed, then it may be deduced that the job or service program 16 is having some network, TMS or device problems (e.g., hanging process), and execution of the test job 96 is killed in step 326. The client 14 also automatically notifies the user and reschedules the test job 96 in step 328.

Referring again to FIG. 8A, after the test job 96 is dispatched and begins executing, the client 14 monitors the heartbeat signal 98 for the test job 96 at a predefined, configurable time interval in step 330. If the heartbeat signal 98 is not present in step 332, then it is deduced that the job is not executing, and referring to FIG. 8B, execution of the test job 96 is killed in step 326. And the client 14 automatically notifies the user and reschedules the test job 96 in step 328.

In one embodiment, computer/network failures are separated from test job 96 failures by implementing a Jini™ leasing mechanism in the service programs 16 in which as long as there is a continued interest for renewal of the lease, the lease is extended. If the computer crashes or the network 13 fails, then the lease is not renewed since there's no continued interest as a result of the crash. Thus, the lease expires. The client 14 checks the expiration of the lease and notifies the user about the problem that occurred at the particular computer/service program 16. While the user investigates the source of the problem, no new test jobs 96 are assigned to the service program 16 running on the computer with the problem and the computer is removed from the lookup service 18. This effectively avoids problem of stale network 13 connections.

If the heartbeat for the test job 96 is present in step 332, then the client 14 retrieves the current snapshot of the log for the test job 96 and compares it with the previous log snapshot in step 334. If there is no difference (delta) between the two snapshots in step 336, it is assumed that the test job 96 is no longer making progress. Therefore, the test job 96 is killed and the user is notified via steps 326 and 328.

If there is a delta between the two logs in step 336, then it is determined if the test job 96 has completed execution in step 338. If the test job 96 has not finished executing, the process continues at step 306. If the test job 96 has finished executing, then it is checked if the job execution time was shorter than the minimum time in step 340. If yes, then it is deduced that something viz. the computer or its settings (e.g., Java is not installed, etc.), etc. is wrong. In this case, the user is notified and the test job 96 is rescheduled in step 342. If the job execution time was not shorter than the minimum time, then the process continues at step 306.

Figure 9:
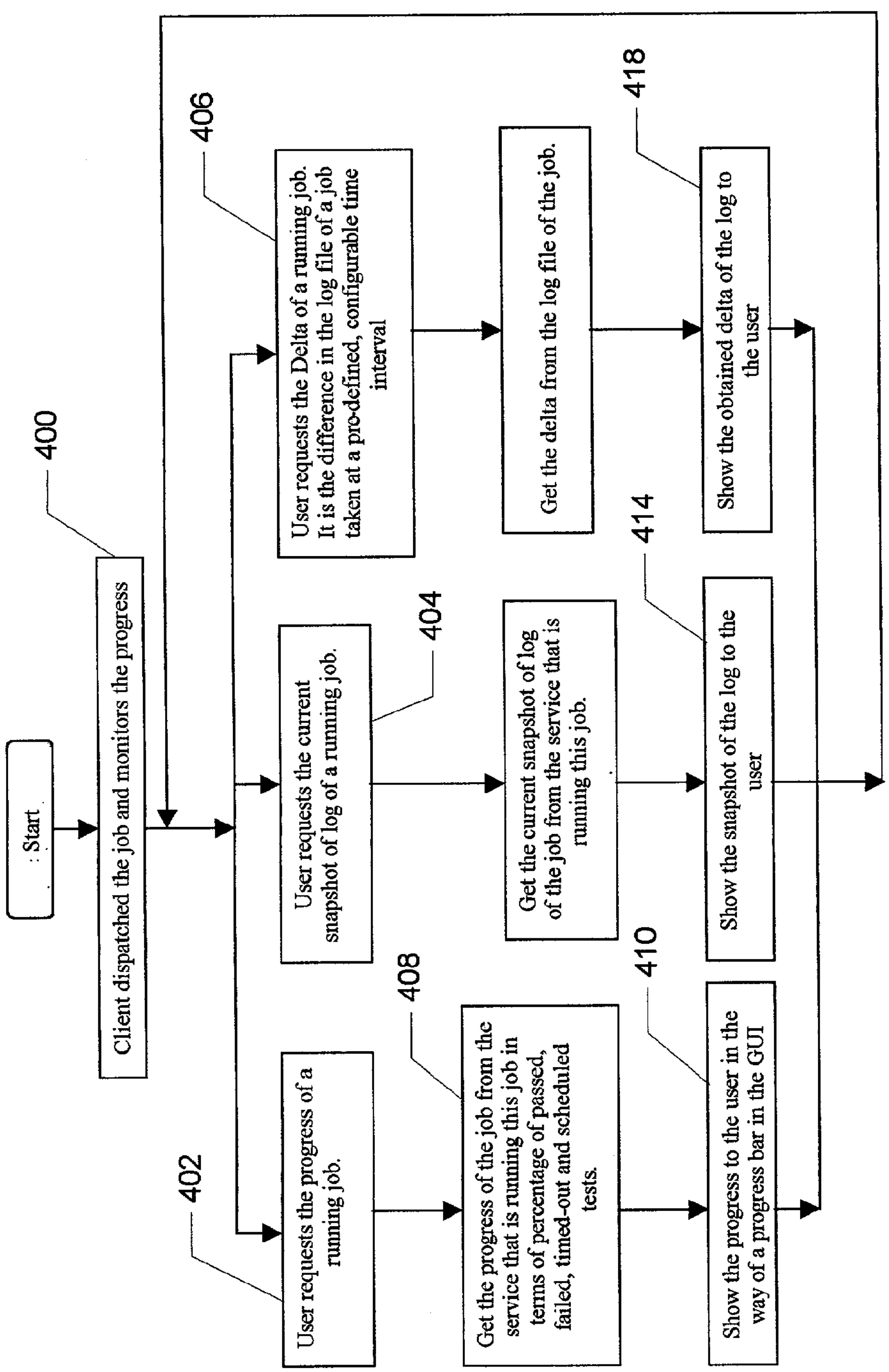
FIG. 9 is a flowchart illustrating the process of displaying progress checks to the user via the GUI.

FIG. 9 is a flowchart illustrating the process of displaying progress checks to the user via the GUI 50. After the client 14 has dispatched one or more test jobs 96 and started monitoring the progress in step 400, options are displayed in the GUI 50 that allow the user to request the progress of a running job in step 402, or current snapshot of the log for a running job in step 404 or the delta of a running job in step 406. It should be noted that the user has the option to display the progress of all the jobs requested simultaneously or to display only one or a group of jobs the user might be interested in. If user chooses a group, the GUI 50 displays the status and progress of only those jobs that belong to that group.

When the user requests the progress of a running job in step 402, the client 14 will request the progress of the job from the service program 16 that is running the test job 96 in step 408. A tightly coupled TMS 94 will respond with the percentage of job completed at that time. This progress will be conveyed to the user via a progress bar in the GUI 50 in step 410.

When the user wants to view the current log snapshot for a job in step 404, the client 14 may request the snapshot from the corresponding service program 16 in step 412 and the snapshot is displayed to the user in step 414. Alternatively, the client 14 may retrieve the snapshot directly from the result/log database.

If the user wants to check the progress of a job during a particular time interval, the user chooses the job and requests the latest delta in step 406. The difference between the current log snapshot and the previous snapshot are then retrieved from the results/log database in step 416, and displayed to the user in step 418.

Because all of the test results are stored in a central location, i.e., the results/log database, the GUI 50 may easily generate any report in HTML format for the user. The GUI 50 may also generate different user views for the same set of results, such as a tester's view, a developer's view, and a manager's view. The different views may mask or highlight the information according to the viewer's interest.

Figure 10:
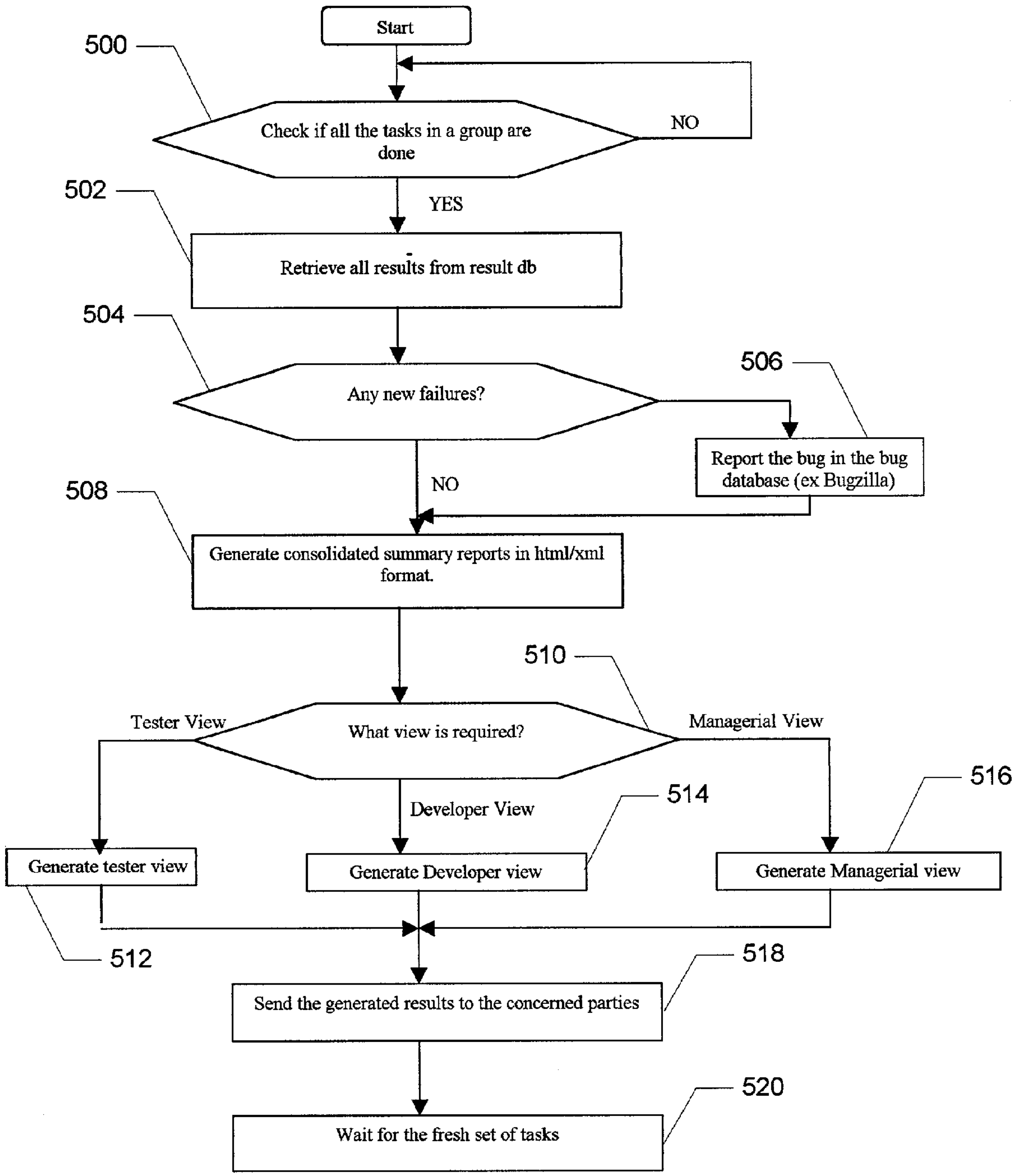
FIG. 10 is a flowchart illustrating the process of result reporting in accordance with a preferred embodiment of the present invention.

FIG. 10 is a flowchart illustrating the result reporting process in accordance with a preferred embodiment of the present invention. The process begins by checking if all the test jobs 96 in a group are completed in step 500. The results are then retrieved from the results/log database in step 502. If there are no new test failures in step 504, the GUI 50 generates a consolidated summary report in step 508, preferably in HTML/XML format. If there are new test failures in step 504, then the bugs are reported in a bug database in step 506.

After the summary report is generated, it is determined what view is required in step 510. If user requires a tester's view of the report, then the tester's view is generated in step 512. If the user requires a developer's view of the report, then a developer's view is generated in step 514. If the user requires a managerial view of the report, then a managerial view is generated in step 516. The generated view is then sent to the specified parties in step 518, and the client 14 waits for new set of test jobs 96 in step 520.

A distributed test execution, management and control system 10 has been disclosed that addresses the difficulties encountered in distributed test management. The present invention provides several advantages, including the following:

- Single Point Of Control: The test management system 10 provides a single point of control from which the user can create, start, stop and manage the test execution on various platforms.
- Scalability: The system 10 is scalable at two levels.
  - At the basic level, the client 14 lets the user add new test to the test queue even when the client 14 is running. There is no need to restart the client 14. The client 14 has the intelligence to detect the arrival of the new tests and will schedule them accordingly.
  - The other level of scalability is that the user can add more computers services to the network 13 even when the client 14 and other services are running by just by starting a service program 16 on the computer. This means that the client 14 can route a starving test job 96 to the computer assuming the computer has the required attributes.
- Fault Tolerance, Notification and Recovery: The system 10 can detect a variety of errors that may occur due to network 13 and computer issues or any other test execution problems such as hung tests. When an error is detected, the system 10 notifies the user and recovers from the error by restoring and rescheduling the test for execution on other available computers 12.
- Central Result Repository: The system 10 provides a central repository of the results for the tests run by the different service programs 16. The user no longer has to make a trip to each of the computers 12 to collect the results. The system 10 can also provide different views of the results for QA engineers, developers, and managers so that each sees only the information pertinent to their jobs. This reduces the time and cost for analyzing and interpreting the results.

No Manual Intervention: Once the user has started the job, there is no need for manual intervention.

The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network 13, and loaded into the machine's memory for execution. Accordingly, many modifications may be made by one of ordinary skill in the art without departing from the spirit and scope of the appended claims.

What is claimed is:

1. A method for automatically managing a distributed software test system, wherein the test system includes a network of test computers for execution of a plurality of test jobs and at least one client computer for controlling the test computers, the method comprising:

(a) providing the test computers with a service program for automatically registering the availability of the computer and the attributes of the computer with the client computer;

(b) comparing execution requirements of each test job with the attributes associated with the available computers;

(c) dispatching the test jobs to the computers having matching attributes;

(d) providing the service programs with a heartbeat function so that the service programs transmit signals at predefined intervals over the network to indicate activity of each test job running on the corresponding computer;

(e) monitoring the signals from the service programs and determining a failure has occurred for a particular test job when the corresponding signal is undetected, and if the corresponding signal is detected, determining a failure has occurred when a comparison of snapshots of test logs produced by the test job indicate that the test job is no longer making progress; and (f) automatically notifying the user when a failure has been detected.

2. The method of claim 1 wherein the step of determining whether a failure has occurred further includes monitoring how long the test jobs wait to be executed by the service programs.

3. The method of claim 1 wherein the step of determining whether a failure has occurred further includes monitoring maximum and minimum time allowed for executing test jobs.

4. The method of claim 1 further including the step of recovering from the failure by automatically rescheduling the failed test job for execution.

5. The method of claim 4 further including the step of rescheduling the failed test job on a different computer.

6. The method of claim 5 further including the step of increasing the priority of the test job to ensure the service programs complete that test job in a timely manner.

7. The method of claim 1 wherein step (d) further includes the step of launching a test management system (TMS) from each of the service programs, and using the TMS to run the test jobs.

8. The method of claim 7 wherein the TMS generates and passes the heartbeat signals to the service program.

9. The method of claim 8 further including providing a client-service mode for TMS in which a TMS-server is started that invokes a server test program and notifies a TMS-client to start and invoke a client test program, whereby once the server and client test programs are started, the server test program and the client test program communicate with each other.

10. The method of claim 1 wherein step (f) further includes the steps of increasing the priority of the test job and rescheduling the test job to ensure that the service programs complete the scheduled test job in a timely manner.

11. The method of claim 1 wherein step (f) further includes the step of notifying the user if the percentage of test failures is greater than or equal to than a predetermined maximum percentage rate of test failures.

12. An automated test management system for testing software applications, comprising:

multiple computers connected to a network wherein the computers have a variety of hardware and software computer attributes;

a lookup service accessible over the network for storing availability and attributes of the computers;

a service program running on each of the computers for registering with the lookup service and publishing the availability and the attributes of the corresponding computer;

at least one central database for storing executable versions of the test jobs, computer attributes required for each test job to run and results and logs produced during execution of these test jobs;

a client software running on at least one of the computers in the network for creating a client that controls and monitors the service programs, wherein the client includes a graphical user interface, a lookup monitor, and a test manager, wherein the lookup monitor checks for the existence of the lookup service and monitors the lookup service to determine if any of the service programs on the network have been updated; and a communications protocol for allowing the client software, the service programs and the lookup service to communicate with one another over the network, wherein when the client determines that test jobs in the central database need to be run, the client queries the lookup service, finds available computers having attributes matching the required attributes of the test jobs and dispatches the test jobs to the corresponding computers, wherein once the service programs receive the test jobs, the service programs initiate execution of the test jobs and transmit heartbeat signals indicating activity of each running test job over the network such that the client can automatically detect test failures by monitoring the heartbeat signals and determine whether a failure has occurred for a particular test job when the corresponding heartbeat signal is not present, wherein upon detecting the failure, the client automatically notifies the user of the failure and reschedules the test job for execution.

13. The system of claim 12 wherein when the client determines that one of the test jobs in the central database needs to be run, the client checks for starvation by starting a timer to keep track of how long the test job waits for one of the service programs to be available.

14. The system of claim 13 wherein if it is determined that a configurable maximum allowed service search time has elapsed, the user is notified, and the test job is rescheduled.

15. The system of claim 14 wherein after dispatching the test job, the client starts monitoring the test job to ensure that the test job does not take more than predetermined time for execution.

16. The system of claim 15 wherein if the maximum execution time has elapsed, then execution of the test job is killed, the user is notified and the test job is rescheduled.

17. The system of claim 16 wherein if the heartbeat for one of the test jobs is present, then a current snapshot of the log for the test job is compared with a previous log snapshot, and if there is no difference then it is assumed that the test job is no longer making progress and the test job is killed.

18. The system of claim 17 wherein once the test job finishes execution and if the job execution time was shorter than a minimum time, it is assumed that there was an error and the user is notified and the test job is rescheduled.

19. The system of claim 12 wherein the graphical user interface (GUI) allows the user to create and update test jobs in the central database and initiates the process of dispatching test jobs to matching computers.

20. The system of claim 19 further including a local database that includes a task repository, an in-process-task repository and a completed task repository.

21. The system of claim 20 wherein the task manager manages the local database by scanning the central database for previous test jobs and any newly added test jobs and creates a file for each of the test jobs in the task repository, wherein each file includes the computer attributes required for the test job, a priority assigned to the test job, and a reference to the executable version of the test job stored in the central database.

22. The system of claim 21 wherein the in-process-task repository stores a reference for each test job currently executing, and the completed task repository stores a reference for each completed test job.

23. The system of claim 22 wherein when a user requests the status of any of the test jobs via the GUI, the local database is queried and the results are returned to the GUI for display.

24. The system of claim 23 wherein service programs are started on the computers as part of the boot process.

25. The system of claim 24 wherein each of the service programs creates an environment to run the test jobs and launches a test management system (TMS), which in turn, runs the test jobs.

26. The system of claim 25 wherein upon detection of a failure, the client reschedules the test job for execution on a different computer.

27. A computer-readable medium containing program instructions for managing and monitoring software test jobs running on a network of computers, the program instructions for:

(a) receiving from a user a plurality of test jobs, each requiring a particular set of computer attributes to run;

(b) providing at least a portion of the computers with a respective service program that automatically registers the computer's availability and attributes with a lookup service on the network;

(c) for each test job, searching the lookup service for a registered computer having attributes matching the attributes required by the test job, and dispatching the test job to that computer;

(d) using the service programs to start execution of the test jobs on the computers;

(e) storing test results and test logs for each test job in a database accessible over the network;

(f) determining if each test job is active during test execution by monitoring a heartbeat signal transmitted from the service programs for each test job and determining that a failure has occurred for a particular test job when the corresponding heartbeat signal is not present, and if the corresponding signal is detected, determining a failure has occurred when a comparison of snapshots of test logs produced by the test job indicate that the test job is no longer making progress;

(g) notifying the user of the failure and rescheduling the test job for execution on a different computer; and (h) allowing the user to monitor status and results of any of the test jobs from at least one of the computers on the network.

* * * * *